United States Patent [19]

Leonelli

[11] Patent Number: 5,573,268
[45] Date of Patent: Nov. 12, 1996

[54] DRIVER'S SIDE AIRBAG COVER INCORPORATING FUNCTION SWITCHES

[75] Inventor: F. Paul Leonelli, Ogden, Utah

[73] Assignee: Morton International, Inc., Chicago, Ill.

[21] Appl. No.: 503,975

[22] Filed: Jul. 19, 1995

[51] Int. Cl.⁶ .................................................. B60R 21/16
[52] U.S. Cl. ..................... 280/731; 200/61.54; 280/728.3
[58] Field of Search ................................. 280/731, 728.1; 200/61.54, 61.55

[56] References Cited

U.S. PATENT DOCUMENTS

| | | | |
|---|---|---|---|
| 3,819,205 | 6/1974 | Dunford et al. | 280/150 AB |
| 4,148,503 | 4/1979 | Shiratori et al. | 280/731 |
| 4,325,568 | 4/1982 | Clark et al. | 280/731 |
| 4,638,131 | 1/1987 | Kidd et al. | 200/61.55 |
| 4,934,735 | 6/1990 | Embach | 280/731 |
| 5,023,412 | 6/1991 | Ishida | 200/61.54 |
| 5,085,461 | 2/1992 | Shibata | 280/731 |
| 5,186,490 | 2/1993 | Adams et al. | 280/731 |
| 5,219,415 | 6/1993 | Weinstein | 200/61.54 |
| 5,280,949 | 1/1994 | Manabe | 280/731 |
| 5,294,147 | 3/1994 | Edge | 280/731 |
| 5,306,040 | 4/1994 | Leonelli et al. | 280/728 B |
| 5,314,203 | 5/1994 | Adams et al. | 280/731 |
| 5,338,906 | 8/1994 | Yokota | 200/61.54 |
| 5,346,173 | 10/1994 | Hongue et al. | 280/731 |
| 5,369,232 | 11/1994 | Leonelli | 280/731 |

Primary Examiner—Eric D. Culbreth
Attorney, Agent, or Firm—George W. Rauchfuss, Jr.; Gerald K. White

[57] ABSTRACT

The driver's side airbag cover of an automotive airbag module is of one-piece, as opposed to layered, construction. It carries keypads within its active region which control function switches. The keypads are housed in openings which are backed by relatively rigid panels. The function switches are membrane switches sandwiched between the keypads and their respective panels.

4 Claims, 1 Drawing Sheet

DRIVER'S SIDE AIRBAG COVER INCORPORATING FUNCTION SWITCHES

TECHNICAL FIELD

This invention relates to motor vehicle airbags. More particularly, it relates to a driver's side airbag having a one-piece cover which incorporates a separate keypad in the active region of the cover.

BACKGROUND ART

Automotive driver's side airbag modules are customarily mounted in the steering wheel. The housing which contains the folded airbag is closed by a decorative cover which faces the driver. The cover is provided with weakened portions which form tearlines. Under the influence of the expanding airbag, the cover bursts along the tearlines so as to form one or more doors which open to release the airbag.

As the airbag cover is centrally mounted within the steering wheel, it provides a very convenient location for the installation of switches to control such functions as radio, air-conditioning, cruise-control, etc. However, it is also true that much of the airbag cover surface comprises an active region. By "active region" is meant those portions of the cover which are forcibly displaced upon rupturing of the tearlines to form the doors which release the airbag. As a result, it is important that any switches mounted within the active region be securely anchored so as not to part from the airbag cover material. One solution to this problem is disclosed in my prior U.S. Pat. No. 5,369,232. That patent describes a cover which has a thinned flexible area, behind which is mounted a membrane switch and a relatively rigid backup panel.

It is often desirable, for either aesthetic or functional reasons, to employ keypads for the control of function switches. Such a keypad would extend through an opening in the cover and might be, for example, slightly raised so as to be easily located by the fingers. A construction which employs such a switch is illustrated and disclosed in U.S. Pat. No. 4,934,735 of Embach. In that patent, however, the cover is actually in two parts. A switch is mounted between the upper wall of a "container" and the upper wall of a "cover", the keypad opening being provided in the cover. It would be desirable, however, to provide a construction wherein a separate keypad is mounted within a single piece cover, thereby simplifying construction and minimizing expense.

Accordingly, it is a primary object of the present invention to provide a keypad in a one-piece, driver's side airbag module cover. Other objects, features and advantages will become apparent from the following description and appended claims.

DISCLOSURE OF INVENTION

The invention comprises a one-piece driver's side airbag housing cover which defines at least one keypad opening in its door creating region. The keypad is mounted within the opening so as to be accessible to the driver. A relatively rigid panel is mounted on the inner surface of the cover and extends over the keypad and keypad opening. A membrane switch is mounted between the keypad and the panel for actuation by the driver upon depression of the keypad.

BEST MODE FOR CARRYING OUT THE INVENTION

Figure 1:
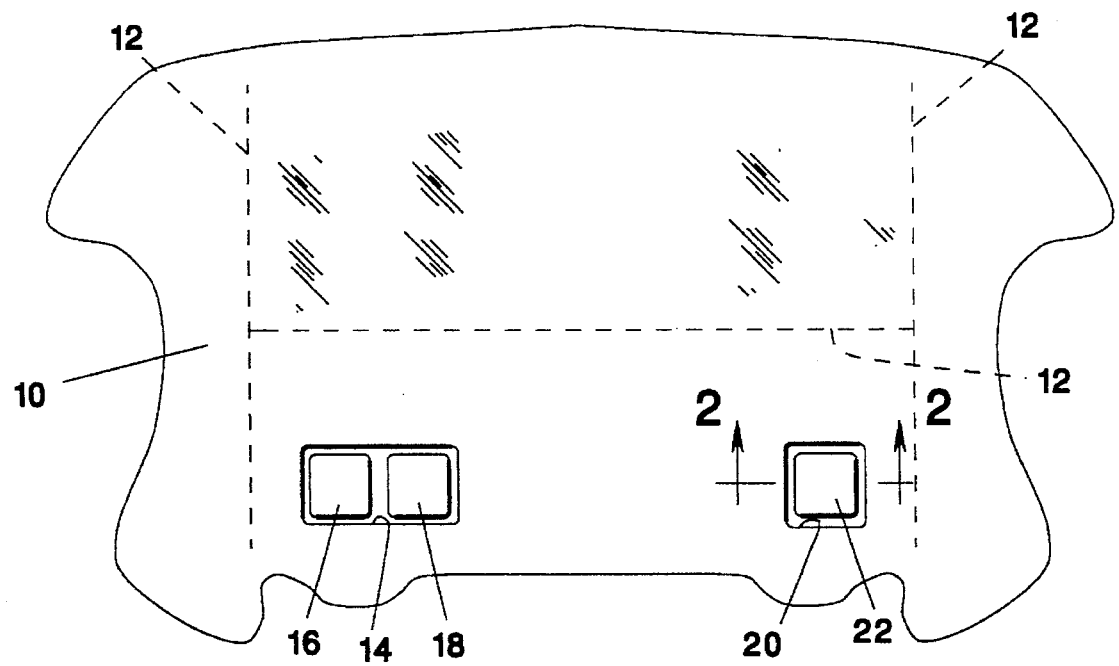
FIG. 1 is a plan view of a driver's side airbag housing cover, as viewed by the driver.

With particular reference to FIG. 1, there is illustrated a one-piece cover 10 for a driver's side airbag module. The cover 10 would normally be mounted within the confines of an automotive steering wheel. It would be mounted upon a housing containing the folded airbag which, in turn, would be connected for actuation by an inflator. As all of these features are conventional and known to those skilled in the art, they need not be further described or illustrated.

The cover 10 is conventionally formed of plastic and is provided with tearlines 12. The tearlines 12 are regions of the cover which are weakened, as by thinning, and are designed to burst under the force of an expanding airbag. In the illustrated embodiment the tearlines 12 are in the shape of an "H." Accordingly, upon bursting they would define upper and lower doors which would be hinged roughly at the upper and lower edges of the cover 10 as viewed in FIG. 1.

In the embodiment illustrated in FIG. 1, the cover is formed with two openings which extend through its door-creating region. A rectangular opening 14 encloses a pair of keypads 16, 18. A square opening 20 encloses a single keypad 22.

Figure 2:
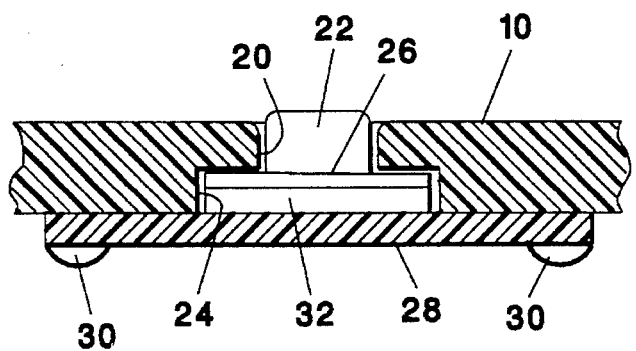
FIG. 2 is an enlarged cross-section taken substantially along the line 2—2 of FIG. 1.

FIG. 2 is representative of the manner in which all the keypads are retained in the door-creating region of the cover 10. As will be apparent, the opening 20 extends into a larger recess 24 on the inner surface of the cover 10. The keypad 22 includes an enlarged base 26 which is mounted within the recess 24. The recess 24 forming a portion of the keypad opening is closed by a relatively rigid plastic panel 28 which is mounted on the inner surface of the cover 10. The panel 28 is secured to the cover 10 by a pair of heat staked pins which extend from the cover 10 through suitable openings (not shown) in the panel 28 to form heads 30. Sandwiched between the panel 28 and the keypad base 26 is a function switch of conventional construction, such as membrane switch 32.

As will be apparent, the surface of the keypad 22 is raised above the surface of the cover 10 where it may be easily found and depressed by the fingers. It may be suitably embossed and back-lighted if desired, such as by electroluminescence or a light-emitting diode. The leads to the membrane switch may be in the form of thin wires or foils such as are well-known to those skilled in the art. In any event, it will be clear that the keypads of the invention are securely retained on the door-creating regions of the cover so that they are not dislodged on airbag inflation. Furthermore, they present no obstruction to airbag inflation.

It is believed that the many-advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A driver's side airbag module having a single cover means comprising a one-piece airbag housing cover having an outer surface and an inner surface, a region of said cover being rupturable along tear lines to create at least one door to release said airbag during inflation, and further comprising:

a keypad opening extending through said cover within the door-creating region thereof wherein said keypad opening comprises an opening portion extending through the outer surface of said cover and a recess portion of larger area extending through the inner surface of said cover;

a keypad mounted within said opening accessible to the driver;

wherein said keypad includes a base larger than said opening portion housed within said recess portion;

a panel more rigid than said cover mounted on the inner surface of said cover and extending, under said keypad and keypad opening; and a function switch mounted between said keypad and panel for actuation by the driver upon depression of said keypad.

2. The airbag module of claim 1 wherein said function switch is positioned between said base and said panel.

3. The airbag module of claim 2 wherein said function switch is a membrane switch.

4. The airbag module of claim 3 wherein said keypad extends above the outer surface of the cover for ready accessibility by the driver.

* * * * *